March 25, 1969     C. E. UPPER     3,434,494

IN-LINE CHECK VALVE

Filed Feb. 28, 1968     Sheet 1 of 2

INVENTOR.
CHARLES E. UPPER
BY
Thomas W. Brennan

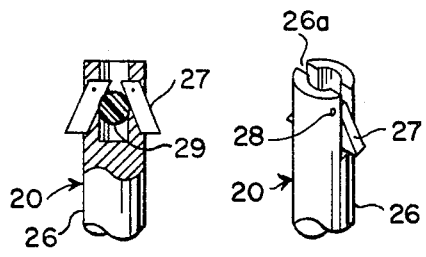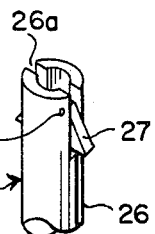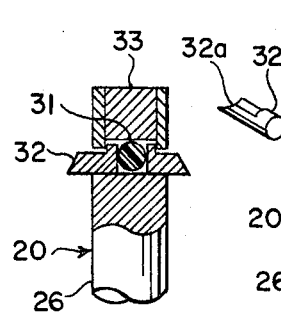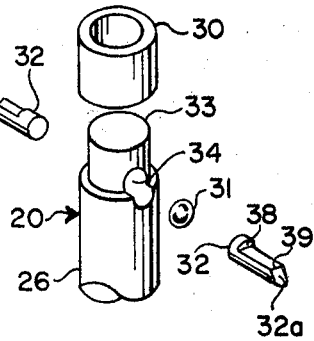
Fig.3-a    Fig.3-b    Fig.4-a    Fig.4-b
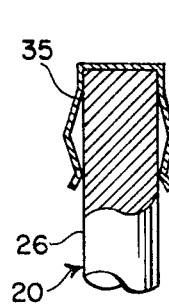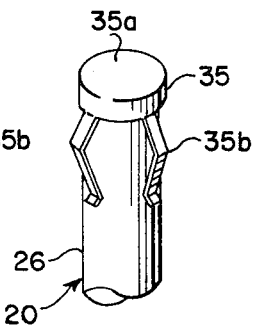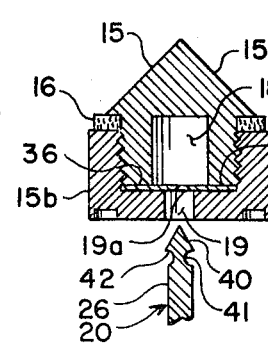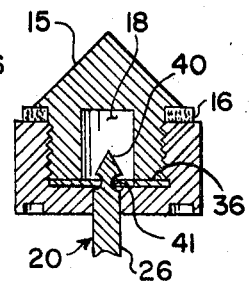
Fig.5-a    Fig.5-b    Fig.6-a    Fig.6-b
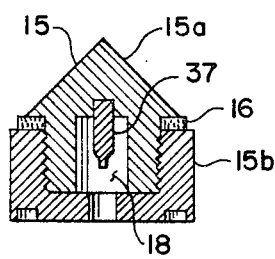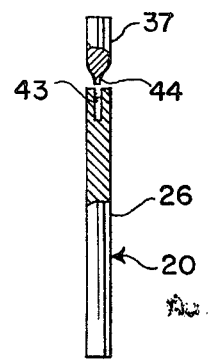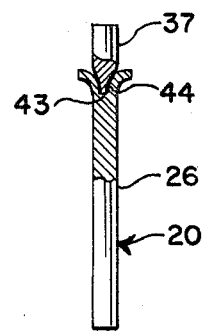
Fig.7    Fig.8-a    Fig.8b
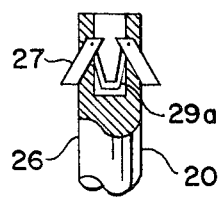
Fig.-9
INVENTOR.
CHARLES E. UPPER
BY
Thomas W. Brennan United States Patent Office 3,434,494
Patented Mar. 25, 1969

3,434,494
IN-LINE CHECK VALVE
Charles E. Upper, Williamsville, N.Y., assignor to Thiokol Chemical Corporation, Bristol, Pa., a corporation of Delaware
Continuation-in-part of application Ser. No. 282,034, May 21, 1963. This application Feb. 28, 1968, Ser. No. 709,077
Int. Cl. F16k 15/14, 21/16, 35/02
U.S. Cl. 137—467                                    8 Claims

ABSTRACT OF THE DISCLOSURE

An in-line check valve normally closed, having a uniquely structured poppet in a housing which is urged toward a closed position by fluid pressure, with or without a helping spring, in one direction and adapted to be opened by fluid pressure in the other direction. Means is also disclosed whereby, upon being opened by said fluid pressure, the valve is locked open thereafter.

---

Figure 1:
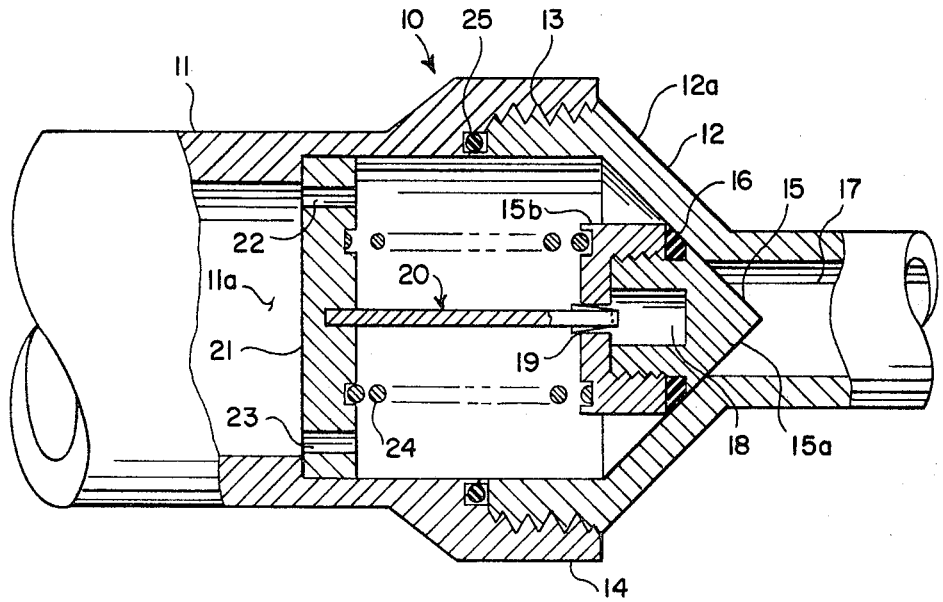

This application is a continuation-in-part of earlier filed application, Ser. No. 282,034, filed May 21, 1963, now abandoned.

This invention relates to check valves, and more particularly to normally closed, in-line or straight flow-through, check valves characterized by a poppet contained in a housing wherein the poppet is urged to bear against a portion of the housing to seal against fluid flowing in one direction and is capable of being unseated at a predetermined fluid pressure to permit flow in the other direction.

Check valves of the herein described type have a multitude of uses in fluid systems of practically every character. The value of this invention is further characterized by the incorporation therein of means to maintain the poppet in the open position upon the attainment of a predetermined inlet pressure. In this respect the valve possesses uniqueness and lends itself admirably for use in rocket motor systems of either the monopropellant or bipropellant type, wherein one or more of the propellants are decomposed by a catalytic agent, but which initially must be combusted with a small amount of another fluid to create sufficient heat to maintain the decomposition thereof.

An example of a monopropellant having the above characteristic is hydrazine ($N_2H_4$), which also is useful as a fuel with nitrogen tetroxide ($N_2O_4$) as an oxidizer in bipropellant rocket motor systems. Ordinarily hydrazine is capable of being decomposed by any number of materials known in the art as "dry catalysts." A widely used catalyst for this purpose is a bed of loose wire coils contained in a wire mesh or screen compartment, and referred to as a "thermal wire coil catalyst bed." As the name implies, the wire coil is heated and when contacted by the hydrazine caused to flow therethrough, decomposes it into products which are gases. Initial heating of the wire coil, which is usually stainless steel, is accomplished by the hypergolic combustion of a small amount of $N_2H_4$ with a correspondingly small amount of the oxidizer, $N_2O_4$. After this the $N_2O_4$ flow is stopped and the $N_2H_4$ flow is increased to the desired amount through operation of the herein described invention as will become apparent from what follows.

Accordingly, it is an object of this invention to provide means for permitting increased flow in a fluid system upon the achievement of a predetermined pressure in the fluid caused to flow. It is another object of the invention to provide the increased fluid flow by means of a normally closed check valve containing a poppet which prevents back flow of fluid but is "locked open" upon the attainment of a predetermined upstream fluid pressure. It is a still further object to provide a straight through fluid flow poppet type valve wherein the poppet is operative against a spring by fluid pressure, and in operating is caused to remain in an open position thereafter to permit increased fluid flow in said valve.

Figure 2:
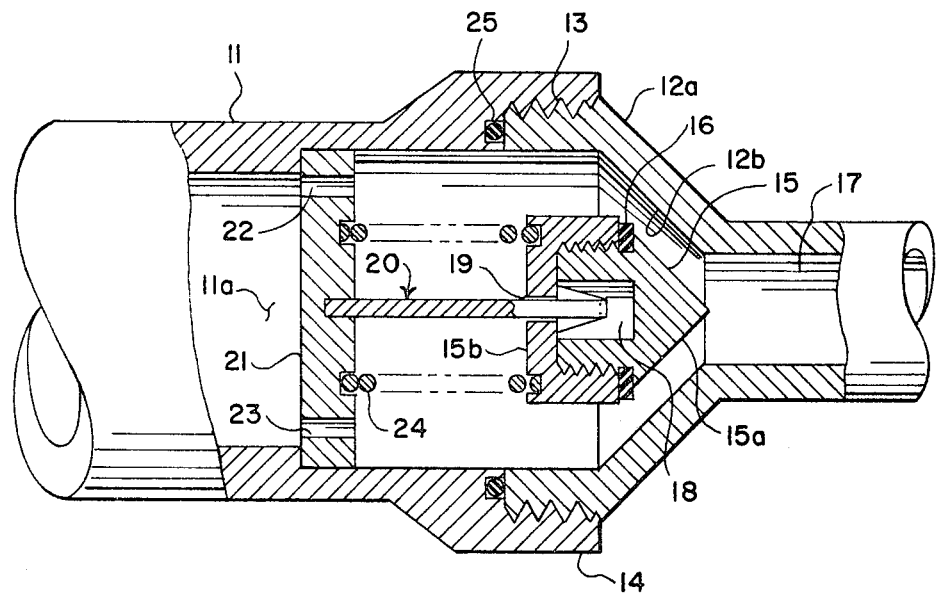

It is still another object of this invention to provide a valve of the type disclosed which is opened by the pressure of the fluid flowing through the valve and is retained in that position by various mechanisms to be disclosed and claimed. Other objects will become apparent from a consideration of the following descriptive specification when viewed in conjunction with the accompanying drawings in which:

FIGURE 1 is a sectional elevational view of the invention showing the valve in its normally closed position;
FIGURE 2 is a view similar to FIGURE 1 showing the valve in the open and locked position;
FIGURE 3–a is a view, partially sectioned, of a portion of the locking pin means of the invention;
FIGURE 3–b is a pictorial elevation of the pin means of FIGURE 3–a;
FIGURES 4–a and 4–b and FIGURES 5–a and 5–b are views, corresponding to FIGURES 3–a and 3–b, of additional modifications of the locking pin means of the invention;
FIGURES 6–a and 6–b are sectional views of a modified poppet means and still another modified locking pin means of the invention;
FIGURE 7 is a view similar to FIGURES 6–a and 6–b of still another modified poppet of the invention;
FIGURES 8–a and 8–b are sectional views of still another modified locking pin means and a portion of the poppet shown in FIGURE 7;
FIGURE 9 is a view of the locking pin means of FIGURE 3–a and 3–b illustrating still another modification thereof;

Referring to FIGURES 1 and 2, valve assembly 10 comprises a housing 14 having two parts, or sections 11 and 12 joined together, for example, by threads 13. Section 12 comprises flared portion 12–a having an internal surface 12–b, which together with annular seal 16 on poppet 15 seals against flow of fluid in the inlet 17 of section 12 when poppet 15 is in the closed position (as seen in FIG. 1). Poppet 15 is also preferably of two pieces 15–a and 15–b threaded together for convenience as shown. Parts or pieces 15–a and 15–b when assembled form a cavity 18 therebetween having an entrance 19 into which protrudes one end of a locking pin 20. Locking pin 20 is fixed to section 11 of housing 14 at its opposite end, through attachment thereof to perforated plate 21, perforations 22 and 23 therein permitting fluid flow thereby into outlet 11–a of valve 10. Outlet 11–a is shown in line with inlet 17 which arrangement, while preferable, is not prerequisite to valve operations. Intermediate of poppet 15 and backing plate 21 is a biasing means, or spring 24 which sealingly urges poppet 15 against internal surface 12–b in section 12 of housing 14.

To prevent fluid leakage from housing 14, O-ring seal 25 is positioned between sections 11 and 12 as shown in FIGURES 1 and 2.

Referring now to the remaining figures, locking pin 20 is illustrated in several embodiments, and is the heart of the improved in-line, check valve of this invention. In particular, in FIGURES 3–a and 3–b locking pin 20 is comprised of a cylindrical shaft 26 having a slotted or bifurcated end 26–a (FIG. 3–b). Bifurcated end 26–a has swivelled therein swivel arms 27 attached by means of pins 28 through the bifurcated end 26–a. Disposed between arms 27 (FIG. 3–a) is resilient plug or other flexible member 29 shown in this instance as a spherical element of rubber or plastic which, as will become apparent, is capable, though deformed by arms 27, of later resuming its original shape. Plug or flexible member 29 can be a spring 29–a, as shown in FIG. 9, or a piston and sleeve assembly (not shown). In fact, any number of expansible mechanisms will also occur to skilled artisans in using this invention.

In the embodiment of FIGS. 4–a and 4–b, locking pin 20 comprises a cylindrical shaft 26 having a transverse passage or hole 34 near one end. The remaining portion 33 of shaft 26 is of reduced diameter for reception thereon of collar or retainer 30. Fitted in passage 34 are pin arms 32 and resilient plug or flexible member 31 therebetween. Assembly of pin 20 is completed when collar 30 is positioned over reduced end 33 thereby containing pin arms 32 and plug 31 in passage 34. To further insure the retention in passage 34 of pin arms 32 and plug 31 pin arms 32 are formed with vertical flat surfaces 38 and horizontal surfaces 39 (FIG. 4–b). Hence collar 30 when positioned over the end 33 of shaft 20, retains pin arms 32 since vertical faces 38 bear against the inside wall of collar 30 and the bottom thereof rests upon horizontal surfaces 39. In addition to the vertical surfaces 38 and horizontal surfaces 39, pin arms 32 have chamfered or beveled edges 32–a which, as will be apparent from what follows hereinafter, perform an important operational function.

FIGS. 5–a and 5–b are illustrative of still another form of the invention wherein locking pin 20 is comprised of cylindrical shaft 26 and a spring member or expansion clip 35 (FIG. 5–b) fastened to the end thereof. Member 35 is preferably a unitary structure comprised of cap portion 35–a and flexible grippers or legs 35–b.

FIGS. 6–a and 6–b show a still further embodiment of the invention wherein poppet 15 has a circular plate spring, or washer member 36 positioned and retained between pieces 15–a and 15–b over exit 19–a of entrance 19. Retaining member 36 has a central hole therein to receive end 40 of locking pin 20. Locking pin 20 is a cylindrical shaft 26, which has its end 40 barbed with a narrow neck portion 41 and broad underside edge 42.

FIGURES 7, 8–a and 8–b together illustrate still one more form of the invention wherein poppet 15 is provided in recess 18, with a ram or piercing pin 37 (FIG. 7). As will be seen from what follows ram 37 cooperatively functions with locking pin 20 in operation of the invention herein. Locking pin 20 again includes cylindrical shaft 26, but in this embodiment has one end formed with a hole or cavity 43 for reception of ram 37 shank end 44 (FIG. 8–a). FIGURE 8–b indicates a preferred manner in which locking pin 20 and ram 37 cooperate upon movement (opening) of poppet 15.

In general, operation of the invention is best understood with reference to FIGS. 1 and 2. In FIGURE 1 pressure upstream in valve inlet 17 rises to a predetermined level and acts against the upstream-most face of piece 15–a of poppet 15. Poppet 15 is thereupon caused to move rapidly leftward (FIG. 2) against spring 24 compressing it. At the same time locking pin 20, which is attached to backing plate 21, enters recess 18 through entrance 19 in poppet 15. Referring now to FIGS. 3–a, 3–b and FIG. 9, locking pin 20 end mounted swivelled arms 27 are thereby forced inward against resilient plug 29 due to constrictive area in entrance 19. Upon passage of arms 27 completely through entrance 19 and envelopment thereof in recess 18, arms 27 are forced outwardly by plug 29 (or spring member 29–a) thus effectively locking poppet 15 in open position. To unlock poppet 15 sections 11 and 12 of housing 14 are disassembled, poppet 15 is removed, and upstream piece 15–a is separated from piece 15–b by unscrewing. Locking pin swivel arms 27 being thereby accessible, are pressed together and backed out of recess 18 through entrance 19. The valve is then reassembled and ready for reuse if desired.

Similarly in FIGS. 4–a and 4–b, as pin 20 enters cavity 18 through entrance 19, pin arms 32 are moved inwardly in lateral passage, or hole 34 against resilient element 31 on chamfered or beveled edges 32–a. Upon full engagement of pin arms 32 within recess 18, resilient plug 31 resumes its original shape which forces arms 32 outwardly, thereby locking poppet 15 in the open position. To reuse poppet 15 is disassembled in the same manner as explained above in connection with the FIG. 3–a and FIG. 3–b embodiment.

In the invention of FIGS. 5–a and 5–b, operation proceeds similarly to that of the previous embodiments. Thus, as locking pin 20 enters recess 18 through entrance 19, spring or clip 35 flexible grippers or legs 35–b are flattened against shaft 26 until the assembly is engaged with cavity 18. Once spring or clip 35 is within recess 18, flexible legs 35–b resume their former position and poppet 15 is again locked open as before. To reuse the FIGS. 5–a and 5–b locking pin, poppet 15 is again disassembled and flexible grippers 35–b are compressed against shaft 26. The downstream piece 15–b is then removed by sliding it over the compressed clip 35. Alternatively clip 35 attachment means in shaft 26 can be such that it is rendered removable therefrom, for reattachment after the poppet piece 15–b is retracted. A suggested means is a screw or bolt (not shown) through cap portion 35–a into the end of shaft 26.

Operation of the invention of FIGS. 6–a and 6–b proceeds initially in a manner similar to the previously explained invention embodiments. In this instance, however, shaft 26 is formed with barbed end 40, while downstream poppet piece 15–b is fitted with plate spring 36. As poppet 15 moves due to fluid inlet pressure, barbed end 40, is forced through the central hole in spring 36 until it is fully engaged in recess 18. Pin 20 barbed end 40 is thus retained as shown in FIG. 6–b by means of the underside surface 42 being held fast by plate spring 36. Once barbed end 40 is forced into engagement with recess 18, poppet 15 becomes locked open as before. To reuse, poppet pieces 15–a and 15–b are again disassembled, permitting access to pin 20 barbed end 40. In this embodiment however, pin 20 can be made detachable from backing plate 21 by any means well known to those having skill in the art, as for instance installing threads in plate 21 to receive pin 20 end which also is threaded.

In the invention as typified in FIGS. 7, 8–a and 8–b, ram or piercing pin 37 (FIG. 7) is installed in poppet piece 15–a and moves therewith. Ram 37 shank end 44 is thereby driven into shaft 26 and cavity 43 and causes end 43 to become deformed as shown, thereby causing poppet 15 to be once again locked in an open position as before. However, in this instance locking pin 20 must be replaced after operation due to the deforming thereof by shank end 44.

What is claimed is:

1. A normally closed, in-line check valve for fluid pressure systems comprising a housing, an internal support plate having at least one perforation in said housing, means defining an internal sealing surface in said housing for receiving, in sealing relationship therewith, a two-piece poppet, said poppet pieces adapted to be joined with a cavity therebetween, a locking pin fixed to said support plate at one end and having an expanding locking means on its opposite end, means defining an entrance to said cavity in one of said poppet pieces, said expanding locking means extending unexpanded at least partially into said entrance, resilient means positioned between said plate and said poppet to urge said poppet against said sealing surfaces for normally closing said valve, said poppet adapted to be separated from said sealing surface in response to upstream fluid pressure, so that said locking pin expanding means enters said cavity and expands therein to lock open said valve.

2. The check valve of claim 1 wherein said locking pin expanding end is bifurcated having resilient means disposed between said bifurcations, and said expanding means comprises at least one locking arm swiveled on at least one of said bifurcations, said arm contacting said resilient means and adapted to swivel inwardly against said resilient means upon opening of said poppet in response to fluid pressure in said valve and outwardly by said resilient means after engagement of said arm in said poppet recess.

3. The check valve of claim 1 wherein at least one of said poppet pieces includes a ramming device disposed in said poppet recess and said locking pin end is deformable and has a cavity therein, said ramming device adapted to expansibly contact said deformable pin end in said pin end cavity to lock open said valve upon movement of said poppet to said valve open position in response to fluid pressure in said valve.

4. The check valve of claim 1 wherein a plate spring having a central hole is disposed at the entrance to said poppet cavity, and said locking pin opposite end is barbed for expansibly passing through said hole in said plate spring and into said cavity to lock open said valve.

5. The check valve of claim 1 wherein the locking pin comprises a cylindrical shaft having a transverse passage and an end portion of smaller diameter, at least one pin arm movably disposed in said passage, resilient means disposed in said passage urgingly contacting said arm to move outwardly, a collar on said smaller diameter shaft portion adapted to limit said outward movement of said arm in said passage and means on said arm for inducing inward movement thereof against said resilient means when said locking pin passes through said entrance to said recess.

6. The check valve of claim 2 wherein said second mentioned resilient means is a resilient plastic plug.

7. The check valve of claim 1 wherein said expanding locking means is an expansion clip on said locking pin opposite end.

8. The check valve of claim 2 wherein said second mentioned resilient means is a spring.

References Cited

UNITED STATES PATENTS

| | | | |
|---|---|---|---|
| 2,525,487 | 10/1950 | Johnson | 137—467 |
| 3,113,172 | 12/1963 | Barr | 137—467 XR |

HAROLD W. WEAKLEY, *Primary Examiner.*

U.S. Cl. X.R.

137—523; 251—116